(12) United States Patent
Xue et al.

(10) Patent No.: US 10,122,278 B1
(45) Date of Patent: Nov. 6, 2018

(54) CONTROL CIRCUIT OPERATING IN PULSE SKIP MODE AND VOLTAGE CONVERTER HAVING THE SAME

(71) Applicant: ANPEC ELECTRONICS CORPORATION, Hsinchu (TW)

(72) Inventors: Ya-Ran Xue, Hsinchu (TW); Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/868,012

(22) Filed: Jan. 11, 2018

(30) Foreign Application Priority Data

Sep. 8, 2017 (TW) .............................. 106130832 A

(51) Int. Cl.
*G05F 1/40* (2006.01)
*H02M 3/158* (2006.01)
*H02M 1/00* (2006.01)

(52) U.S. Cl.
CPC ............. *H02M 3/158* (2013.01); *H02M 1/00* (2013.01); *H02M 2001/0025* (2013.01)

(58) Field of Classification Search
CPC ............... H02M 3/156; H02M 3/1563; H02M 2001/0067; H02M 3/33507; H02M 2001/0009

USPC ...... 323/282–288, 351, 316, 299; 363/21.08, 363/21, 12, 21.18
See application file for complete search history.

(56) References Cited

U.S. PATENT DOCUMENTS

| | | | | |
|---|---|---|---|---|
| 8,253,407 B2* | 8/2012 | Chen | ................... | H02M 3/1588 323/284 |
| 8,269,472 B2* | 9/2012 | Lin | ..................... | H02M 3/1582 323/282 |
| 8,587,283 B2* | 11/2013 | Wu | ........................ | H02M 3/156 323/284 |
| 8,593,122 B2* | 11/2013 | Chen | ................... | H02M 3/1582 323/284 |
| 8,729,880 B2* | 5/2014 | McCloy-Stevens | ........................ | H02M 3/1588 323/282 |

* cited by examiner

*Primary Examiner* — Rajnikant Patel
(74) *Attorney, Agent, or Firm* — Li & Cai Intellectual Property (USA) Office

(57) ABSTRACT

The present disclosure provides a control circuit operating in a pulse skip mode (PSM) and a voltage converter having the same, which adaptively adjust the related values in PSM through a pulse skip circuit. More specifically, the pulse skip circuit adaptively adjusts a second comparator signal indicating a second signal (related to a feedback signal with a lower gain) and/or indirectly adjusts a first comparator signal indicating a first signal (related to a feedback signal with a higher gain) to adaptively adjust the on-time of a high-side switch and the on-time of a low-side switch during PSM, thereby reducing the output current ripple.

11 Claims, 4 Drawing Sheets

CONTROL CIRCUIT OPERATING IN PULSE SKIP MODE AND VOLTAGE CONVERTER HAVING THE SAME

BACKGROUND

1. Technical Field

The present disclosure relates to a control circuit and a voltage converter having the same, and in particular, to a control circuit operating in pulse skip mode (PSM) and a voltage converter having the same.

2. Description of Related Art

For power management in a system, voltage converters are often used to provide different levels of operating voltage. An ideal voltage converter is capable of providing a stable output voltage and a wide-range output current. When the load changes instantaneously, the output voltage can still be stabilized at the original voltage level and quickly provide the corresponding load current, thereby efficiently converting the voltage.

There are many types of voltage converters, for example, buck converters, boost converters, inverter converters, buck-boost converters, etc. Taking a buck converter as an example, with the circuit construction thereof shown in FIG. 1A, the buck converter 10 is used for converting the input voltage Vin into the output voltage Vout to drive a load (represented by the capacitor Cp). The buck converter 10 includes a switch circuit 12 (including a high-side switch Sup, a low-side switch Sdn, and an inductor L), a feedback circuit 14, and a switch driving circuit 16. The feedback circuit 14 divides the output voltage Vout by two series resistors R1 and R2 to generate the corresponding feedback voltage Vfb to the switch driving circuit 16. The switch driving circuit 16 generates control signals C1 and C2 according to the feedback voltage Vfb to control the high-side switch Sup and the low-side switch Sdn, thereby charging or discharging the inductor L. Therefore, the switch driving circuit 16 drives the switch circuit 12 to generate the necessary load current and the stable output voltage Vout.

When each voltage converter operates under light load condition (e.g., the load current is less), it will operate in a pulse skip mode (hereinafter referred to as "PSM") to reduce the power consumption. As shown in FIG. 1B, the switch driving circuit 36 of the voltage converter 30 will receive a pulse skip signal SKIP generated from the pulse skip circuit 38. When the pulse skip circuit 38 enables the pulse skip signal SKIP, the voltage converter 30 operates in PSM. At this time, the control signal C1 should be kept off and the control signal C2 should be kept off to make the switch circuit 32 not switch to reduce the power consumption of the high-side switch and the low-side switch (not shown in FIGs), thereby improving the power consumption issue of the voltage converter 30 operating under the light load condition.

Since the feedback circuit 34 will be affected by the input voltage Vin, the output voltage Vout, and the load current and generate difference feedback voltages, the high-side switch and the low-side switch operating in PSM cannot maintain a minimum on-time, so that the current ripple of the load increases. The larger current ripple will cause additional wear and tear on the inductor and the load capacitor Cp. Therefore, it is necessary to reduce the current ripple when the voltage converter operates in PSM.

SUMMARY

Accordingly, exemplary embodiments of the present disclosure provide a control circuit operating in pulse skip mode (PSM) and a voltage converter having the same, which adaptively adjust the related values in PSM through a pulse skip circuit to determine the on-time of a high-side switch and the on-time of a low-side switch during PSM, thereby reducing the output current ripple.

An exemplary embodiment of the present disclosure provides a control circuit operating in a PSM. The control circuit is adapted for a voltage converter and is used for converting an input voltage into an output voltage by controlling an output-stage circuit of the voltage converter. The output-stage circuit generates a feedback voltage related to the output voltage and the control circuit includes a PWM generation circuit, a pulse skip circuit, and a switch driving circuit. The PWM generation circuit is coupled to the output-stage circuit and is configured for generating a first signal indicating the feedback voltage condition and a duty-cycle signal in a PWM mode by a first error amplifier. The pulse skip circuit is coupled to the output-stage circuit and the PWM generation circuit. The pulse skip circuit receives the first signal, generates a second signal indicating the feedback voltage condition by a second error amplifier, generates a second comparator signal according to the second signal, and compares the first signal with the second comparator signal to generate a standby signal in PSM. A gain value of the second error amplifier is less than a gain value of the first error amplifier. The switch driving circuit is coupled to the PWM generation circuit, the pulse skip circuit and the output-stage circuit. The switch driving circuit is configured for receiving the duty-cycle signal and the standby signal. When the standby signal indicates that the first signal is less than the second comparator signal, the switch driving circuit operates in PSM and decreases the duty-cycle signal to generate a control signal to drive the output-stage circuit. When the standby signal indicates that the first signal is more than or equal to the second comparator signal, the switch driving circuit operates in the PWM mode and generates the control signal according to the duty-cycle signal to drive the output-stage circuit.

An exemplary embodiment of the present disclosure provides a voltage converter operating in a PSM. The voltage converter includes an output-stage circuit, a PWM generation circuit, a pulse skip circuit, and a switch driving circuit. The output-stage circuit converts an input voltage into an output voltage and generates a feedback voltage related to the output voltage. The PWM generation circuit is coupled to the output-stage circuit and generates a first signal indicating the feedback voltage condition and a duty-cycle signal in a PWM mode by a first error amplifier. The pulse skip circuit is coupled to the output-stage circuit and the PWM generation circuit, receives the first signal, generates a second signal indicating the feedback voltage condition by a second error amplifier, generates a second comparator signal according to the second signal, and compares the first signal with the second comparator signal to generate a standby signal in PSM. A gain value of the second error amplifier is less than a gain value of the first error amplifier. The switch driving circuit is coupled to the PWM generation circuit, the pulse skip circuit and the output-stage circuit. The switch driving circuit receives the duty-cycle signal and the standby signal. When the standby signal indicates that the first signal is less than the second comparator signal, the switch driving circuit operates in PSM and decreases the duty-cycle signal to generate a control signal to drive the output-stage circuit. When the standby signal indicates that the first signal is more than or equal to the second comparator signal, the switch driving circuit operates in the PWM mode and generates the control signal according to the duty-cycle signal to drive the output-stage circuit.

An exemplary embodiment of the present disclosure provides a control circuit operating in a PSM. The control circuit is adapted for a voltage converter and is used for converting an input voltage into an output voltage by controlling an output-stage circuit of the voltage converter. The output-stage circuit generates a feedback voltage related to the output voltage and the control circuit includes a PWM generation circuit, a pulse skip circuit, and a switch driving circuit. The PWM generation circuit is coupled to the output-stage circuit and generates a first signal indicating the feedback voltage condition and a duty-cycle signal in a PWM mode by a first error amplifier. The pulse skip circuit is coupled to the output-stage circuit and the PWM generation circuit. The pulse skip circuit receives the first signal, generates a second signal indicating the feedback voltage condition by a second error amplifier, generates a first comparator signal according to the first signal and the second signal, and compares the first comparator signal with a constant voltage signal related to the first signal to generate a standby signal in PSM. A gain value of the second error amplifier is less than a gain value of the first error amplifier. The switch driving circuit is coupled to the PWM generation circuit, the pulse skip circuit and the output-stage circuit. The switch driving circuit is configured for receiving the duty-cycle signal and the standby signal. When the standby signal indicates that the first comparator signal is less than the constant voltage signal, the switch driving circuit operates in PSM and decreases the duty-cycle signal to generate a control signal to drive the output-stage circuit. When the standby signal indicates that the first comparator signal is more than or equal to the constant voltage signal, the switch driving circuit operates in the PWM mode and generates the control signal according to the duty-cycle signal to drive the output-stage circuit.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
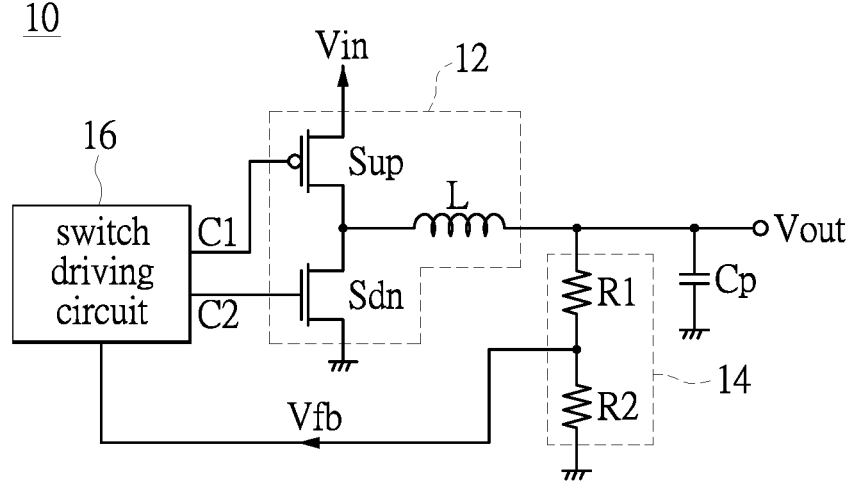
FIG. 1A shows a diagram of a conventional buck converter.
Figure 1B:
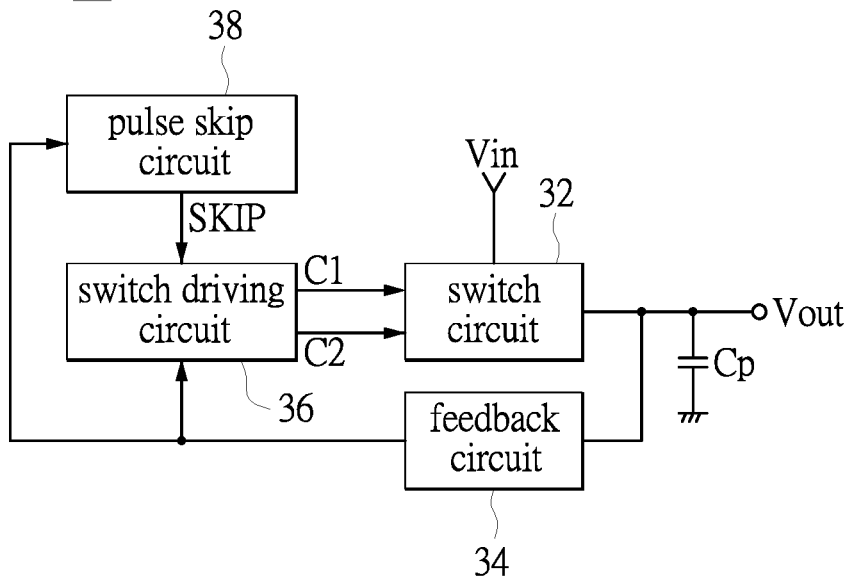
FIG. 1B shows a diagram of a conventional voltage converter operating in a PSM.

Reference will now be made in detail to the exemplary embodiments of the present disclosure, examples of which are illustrated in the accompanying drawings. Wherever possible, the same reference numbers are used in the drawings and the description to refer to the same or like parts.

The present disclosure provides a control circuit operating in a PSM and a voltage converter having the same, which adaptively adjust the related values in PSM through a pulse skip circuit. More specifically, the pulse skip circuit adaptively generates a second comparator signal according to a second signal (related to a feedback signal with a lower gain) and/or generates the first comparator signal according to a first signal (related to a feedback signal with a higher gain), thereby reducing the on-time of a high-side switch and the on-time of a low-side switch during PSM and reducing the output current ripple. The control circuit operating in PSM and the voltage converter having the same provided in the exemplary embodiment of the present disclosure will be described in the following paragraphs.

Figure 2:
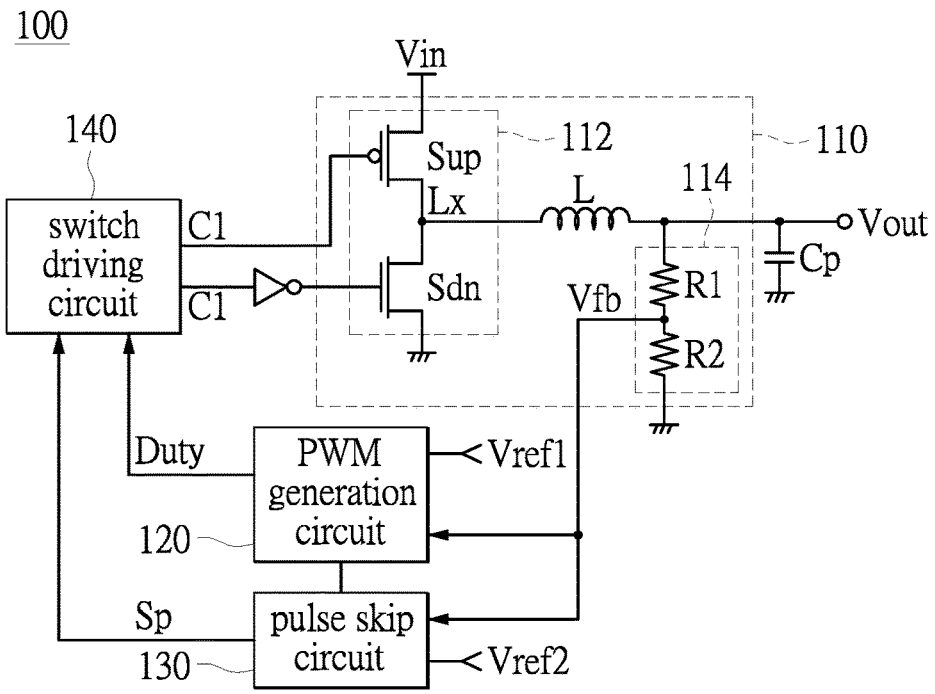
FIG. 2 shows a diagram of a voltage converter according to an embodiment of the present disclosure.

Reference is first made to FIG. 2, which shows a diagram of a voltage converter according to an embodiment of the present disclosure. As shown in FIG. 2, the voltage converter 100 is used for converting an input voltage Vin into an output voltage Vout to drive a load (represented by the capacitor Cp). The voltage converter 100 includes an output-stage circuit 110, a PWM generation circuit 120, a pulse skip circuit 130, and a switch driving circuit 140. The output-stage 110 converts the input voltage Vin into the output voltage Vout to drive the load (represented by the capacitor Cp). The output-stage circuit 110 also generates a feedback voltage Vfb related to the output voltage Vout to the PWM generation circuit 120 and the pulse skip circuit 130. In the present disclosure, the voltage converter 100 can be a buck converter, a boost converter, a buck-boost converter, or other types of voltage converters. The present disclosure is not limited thereto.

More specifically, the output-stage circuit 110 includes a switch circuit 112, an inductor L, and a feedback circuit 114. The switch circuit 112 has a high-side switch Sup and a low-side switch Sdn. An end of the high-side switch Sup receives an input voltage Vin and another end of the high-side switch Sup connects to ground through the low-side switch Sdn. A connection end Lx is provided between the high-side switch Sup and the low-side switch Sdn.

A connection end Lx is provided between the high-side switch Sup and the low-side switch Sdn. The inductor L is coupled to the connection end Lx and generates the output voltage Vout according to an inductive current IL. The feedback circuit 114 is coupled to the inductor L and generates the feedback voltage Vfb according to the output voltage Vout. In the present embodiment, the feedback circuit 114 divides the output voltage Vout by two series resistors R1 and R2 to generate the corresponding feedback voltage Vfb to the PWM generation circuit 120 and the pulse skip circuit 130.

Figure 3:
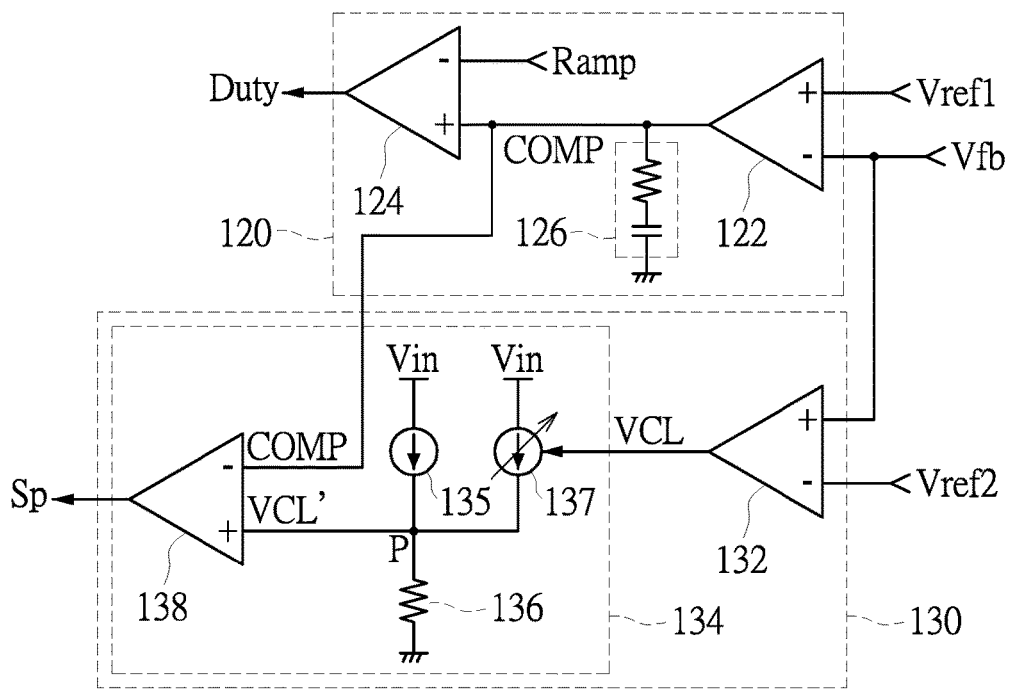
FIG. 3 shows a diagram of a PWM generation circuit and a pulse skip circuit according to an embodiment of the present disclosure.

Reference is made to FIG. 3, PWM generation circuit 120 is coupled to the output-stage circuit 110 and generates a first signal COMP indicating the feedback voltage condition and a duty-cycle signal Duty in a PWM mode by a first error amplifier. The PWM generation circuit 120 includes a first error amplifier 122 and a comparator 124. The first error amplifier 122 receives the feedback voltage Vfb and a first reference voltage Vref1 to accordingly generate the first signal COMP. More specifically, a positive input end of the PWM generation circuit 120 receives the first reference voltage Vref1. A negative input end of the PWM generation circuit 120 receives the feedback voltage Vfb. An output end of the PWM generation circuit 120 outputs the first signal COMP.

The comparator 124 is coupled to the first error amplifier 122 and receives a sawtooth signal Ramp and the first signal COMP. The comparator 124 compares the sawtooth signal Ramp with the first signal COMP to generate a duty-cycle signal Duty in the PWM mode. More specifically, a positive input end of the comparator 124 receives the first signal COMP, a negative input end of the comparator 124 receives the sawtooth signal Ramp, and an output end of the comparator 124 outputs the duty-cycle signal Duty in the PWM mode. In the present disclosure, the sawtooth signal Ramp can also be replaced by a triangular wave signal, but the present disclosure is not limited thereto. In addition, the PWM generation circuit 120 can further include a compensation element 126. The compensation element 126 is coupled between the first error amplifier 122 and the comparator 124. The compensation element 126 is a resistor-capacitor (RC) circuit that can adjust the bandwidth of the system circuit to stabilize the system loop.

Returning to FIG. 2, the pulse skip circuit 130 is coupled to the output-stage circuit 110 and the PWM generation circuit 120. The pulse skip circuit 130 generates a second signal indicating the feedback voltage condition by a second error amplifier and receives the first signal COMP. Then, the pulse skip circuit 130 adjusts and generates a second comparator signal according to the second signal. The skip circuit 130 compares the first signal with the second comparator signal to generate a standby signal Sp in a PSM. It is worth noting that a gain value of the second error amplifier is less than a gain value of the first error amplifier, so that the first signal related to the feedback voltage condition and the second signal related to the feedback voltage condition can be different values according to the corresponding gain values. In addition, in the present disclosure, the gain value of the first error amplifier has a first upper limit value and the gain value of the second error amplifier has a second upper limit value, so that the aforementioned two gain values are distributed within a reasonable range.

More specifically, referring to FIG. 3, the pulse skip circuit 130 includes a second error amplifier 132 and a voltage adjustment element 134. The second error amplifier 132 receives the feedback voltage Vfb and a second reference voltage Vref2 to generate the second signal VCL. A positive end of the second error amplifier 132 receives the feedback voltage Vfb. A negative end of the second error amplifier 132 receives the second reference voltage Vref2. An output end of the second error amplifier 132 outputs the second signal VCL.

The voltage adjustment element 134 is coupled to the second error amplifier 132 and the PWM generation circuit 120. The voltage adjustment element 134 receives the first signal COMP and the second signal VCL. In the present disclosure, the voltage adjustment element 134 accordingly generates a second comparator signal VCL' according to the second signal VCL. The second comparator signal VCL' indicates the adjusted second signal VCL. More specifically, the voltage adjustment element 134 increases the second comparator signal VCL' according to the value of the second signal VCL. This means that when the value of the second signal VCL becomes higher, the value of the second comparator signal VCL' generated from the voltage adjustment element 134 also becomes higher. Conversely, when the value of the second signal VCL becomes lower, the value of the second comparator signal VCL' generated from the voltage adjustment element 134 becomes lower. The voltage adjustment element 134 then compares the first signal COMP with the second comparator signal VCL' to generate the standby signal Sp in PSM.

In the present disclosure, the voltage adjustment element 134 has a constant current source 135, a resistor 136, a variable current source 137, and a comparator 138. The constant current source 135 connects the resistor 136 in series. The variable current source 137 electrically connects an end-point P between the constant current source 135 and the resistor 136. The variable current source 137 connects the constant current source 135 in parallel. Therefore, the variable current source 137 generates the second comparator signal VCL' at the end-point P according to the value of the second signal VCL and the constant current source 135. The second comparator signal VCL' indicates the increased second signal VCL. A positive end of the comparator 138 receives the second comparator signal VCL'. A negative end of the comparator 138 receives the first signal COMP. The comparator 138 compares the first signal COMP with the second comparator signal VCL' to output the standby signal Sp in PSM to an output end of the comparator 138. The voltage adjustment element 134 can be composed of other electronic elements, and the present disclosure is not limited thereto.

Similarly, the aforementioned voltage adjustment element 134 can also generate the second comparator signal VCL' indicating the increased second signal VCL (not shown in FIGs) according to the value of the first signal COMP and the value of the second signal VCL. The voltage adjustment element 134 compares the first signal COMP and the second comparator signal VCL' to generate the standby signal Sp in PSM. The present disclosure is not limited thereto.

Returning to FIG. 2, the switch driving circuit 140 is coupled to the PWM generation circuit 120, the pulse skip circuit 130, and the output-stage circuit 110. The switch driving circuit 140 receives the duty-cycle signal Duty and the standby signal Sp. When the standby signal Sp indicates that the adjusted first signal is less than the adjusted second comparator signal, the switch driving circuit 140 operates in PSM and decreases the duty-cycle signal Duty to generate a control signal C1 for driving the output-stage circuit 112. When the standby signal Sp indicates that the adjusted first signal is more than or equal to the adjusted second comparator signal, the switch driving circuit 140 operates in the PWM mode and generates the control signal C1 according to the duty-cycle signal Duty for driving the output-stage circuit 112. With respect to the switch driving circuit 140 operating in PSM or in the PWM mode to generate the control signal C1 for driving the output-stage circuit 112, since persons of ordinary skill in the art should understand the operation of the switch driving circuit 140, detailed description thereof is omitted herein.

Figure 4:
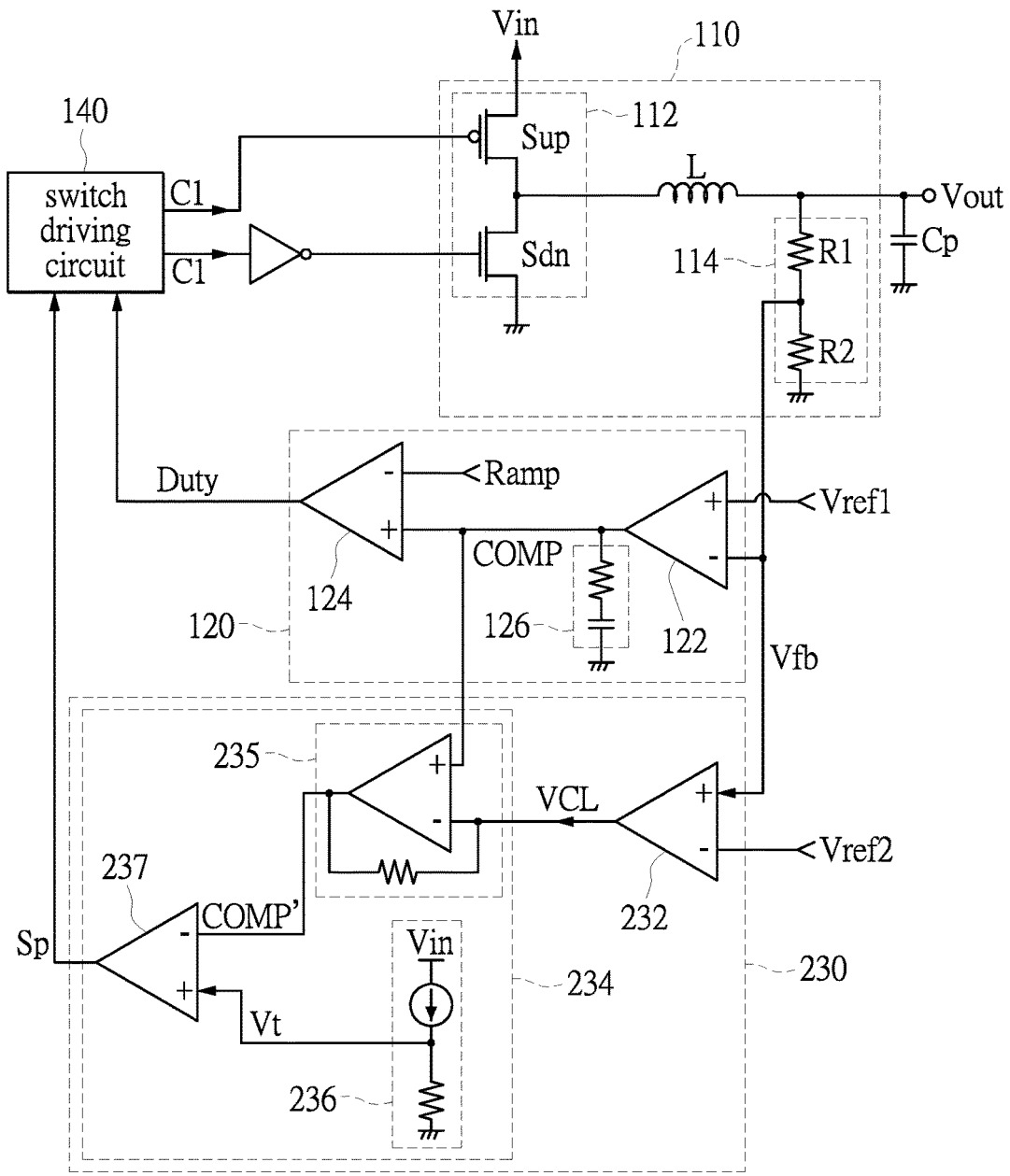
FIG. 4 shows a diagram of a voltage converter according to another embodiment of the present disclosure.

In other embodiments, the voltage adjustment element can also generate a first comparator signal COMP' according to the second signal and the first signal COMP. Then, the voltage adjustment element compares the first comparator signal and a constant voltage signal to generate the standby signal Sp in PSM. Referring to FIG. 4, a diagram of a voltage converter according to another embodiment of the present disclosure is shown. As shown in FIG. 4, the voltage converter 200 includes an output-stage circuit 110, a PWM generation circuit 120, a pulse skip circuit 230, and a switch driving circuit 140. As the output-stage circuit 110, the PWM generation circuit 120, and the switch driving circuit 140 are illustrated in the previous exemplary embodiments, detailed description thereof is omitted herein.

The difference is that the pulse skip circuit 230 adjusts the first comparator signal COMP'. More specifically, the pulse skip circuit 230 is coupled to the output-stage circuit 110 and the PWM generation circuit 120. The pulse skip circuit 230 generates the second signal VCL indicating the feedback voltage condition by a second error amplifier 232 and receives the first signal COMP. The pulse skip circuit 230 then generates the first comparator signal COMP' according to the second signal VCL and the first signal COMP. The pulse skip circuit 230 compares the first comparator signal with a constant voltage signal Vt to generate the standby signal Sp in PSM. It is worth noting that the gain value of the second error amplifier is less than the gain value of the first error amplifier. The first signal and the second signal related to the feedback voltage condition can generate a different value according to the corresponding gain value. Furthermore, in the present disclosure, the gain value of the first error amplifier has a first upper limit value and the gain value of the second error amplifier has a second upper limit value, so that the aforementioned two gain values can be distributed within a reasonable range.

More specifically, the pulse skip circuit 230 includes the second error amplifier 232 and the voltage adjustment element 234. The second error amplifier 232 receives the feedback voltage Vfb and a second reference voltage Vref2 to accordingly generate the second signal VCL. More specifically, a positive input end of the second error amplifier 232 receives the feedback voltage Vfb. A negative input end of the second error amplifier 232 receives the second reference voltage Vref2. An output end of the second error amplifier 232 outputs the second signal VCL.

The voltage adjustment element 234 is coupled to the second error amplifier 232 and the PWM generation circuit 120. The voltage adjustment element 234 receives the first signal COMP and the second signal VCL. In the present disclosure, the voltage adjustment element 234 decreases the value of the first comparator signal COMP' according to the second signal VCL and the first signal COMP. The first comparator signal COMP' indicates the decreased first signal COMP. This means that when the value of the second signal VCL becomes higher, the value of the first comparator signal COMP' generated from the voltage adjustment element 234 becomes lower. Conversely, when the value of the second signal VCL becomes lower, the value of the first comparator signal COMP' generated from the voltage adjustment element 234 becomes higher. The voltage adjustment element 234 then compares the first comparator signal COMP' with the constant voltage signal Vt to generate the standby signal Sp in PSM.

In the present disclosure, the voltage adjustment element 234 has a voltage follower 235, a constant voltage generator 236, and a comparator 237. A positive input end of the voltage follower 235 receives the first signal COMP. A negative input end of the voltage follower 235 receives the second signal VCL. The voltage follower 235 generates the first comparator signal COMP' according to the first signal COMP and the second signal VCL. The first comparator signal COMP' indicates the decreased first signal COMP. The constant voltage generator 236 is used to generate the constant voltage signal Vt. More specifically, the constant voltage generator 236 has a current source and a resistor. An end of the current source receives the input voltage Vin. The other end of the current source connects the resistor in series to ground. Therefore, the constant voltage generator 236 generates the constant voltage signal Vt according to the input voltage Vin, the current source, and the resistor. A positive input end of the comparator 237 receives the constant voltage signal Vt. A negative input end of the comparator 237 receives the first comparator signal COMP'. The comparator 237 compares the first comparator signal COMP' and the constant voltage signal Vt to generate the standby signal Sp in PSM. The voltage adjustment element 234 can also be composed of other electronic components. The present disclosure is not limited thereto.

Figure 5:
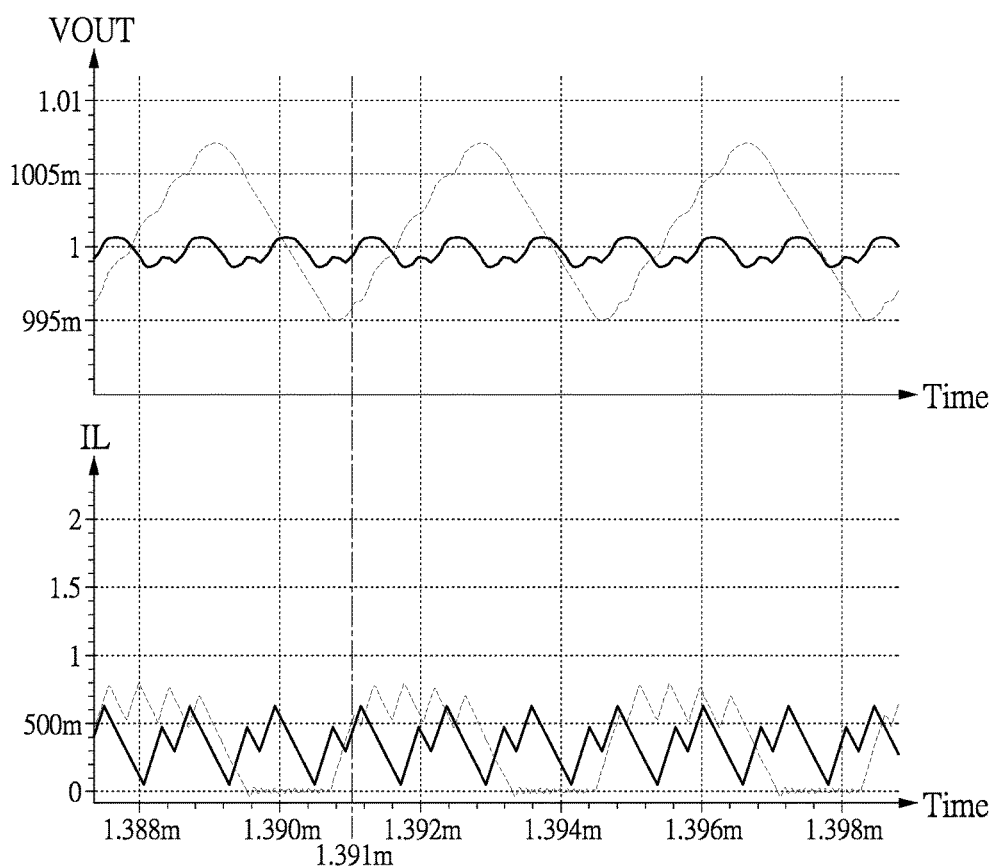
FIG. 5 shows a comparison diagram between a conventional voltage converter and a voltage converter of the present disclosure.

Therefore, the present disclosure provides the control circuit operating in PSM and the voltage converter having the same, which adaptively adjust the second comparator signal (e.g., the second comparator signal VCL' of the pulse skip circuit 134, and the second comparator signal VCL' indicates the increased second signal VCL) and/or adjust the first comparator signal (e.g., the first comparator signal COMP' of the pulse skip circuit 234, and the first comparator signal COMP' indicates the decreased first signal COMP) to decrease the on-time of the high-side switch and the on-time of the low-side switch during PSM. Referring to FIG. 5, a comparison diagram between a conventional voltage converter and a voltage converter of the present disclosure is shown. As shown in FIG. 5, the dashed line indicates the related signal of the conventional voltage converter and the solid line indicates the related signal of the voltage converter of the present disclosure. Since the present voltage converter adaptively adjusts the second comparator signal and/or the first comparator signal to decrease the on-time of the high-side switch Sup and the on-time of the low-side switch Sdn when the conventional voltage converter operates in PSM, the variation of the inductor current IL of the present voltage converter is lower than that of the conventional voltage converter. Thus, the variation of the output voltage Vout of the present voltage converter is lower than that of the conventional voltage converter. Accordingly, the output current ripple of the load of the present disclosure will be lower than that of the load in the prior art.

In summary, the present disclosure provides the control circuit operating in PSM and the voltage converter having the same, which adaptively adjust the related values in PSM through a pulse skip circuit to determine the on-time of the high-side switch and the on-time of the low-side switch during PSM, thereby reducing the output current ripple.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A control circuit operating in a pulse skip mode (PSM), adapted for a voltage converter and used for converting an input voltage into an output voltage by controlling an output-stage circuit of the voltage converter, wherein the output-stage circuit generates a feedback voltage related to the output voltage, the control circuit comprising:

a pulse width modulation (PWM) generation circuit coupled to the output-stage circuit and configured for generating a first signal indicating the feedback voltage condition and a duty-cycle signal in a PWM mode by a first error amplifier;
a pulse skip circuit coupled to the output-stage circuit and the PWM generation circuit, configured for receiving the first signal, generating a second signal indicating the feedback voltage condition by a second error amplifier, generates a second comparator signal according to the second signal, and comparing the first signal with the second comparator signal to generate a standby signal in PSM, wherein a gain value of the second error amplifier is less than a gain value of the first error amplifier; and
a switch driving circuit coupled to the PWM generation circuit, the pulse skip circuit and the output-stage circuit and configured for receiving the duty-cycle signal and the standby signal;
wherein when the standby signal indicates that the first signal is less than the second comparator signal, the switch driving circuit operates in PSM and decreases the duty-cycle signal to generate a control signal to drive the output-stage circuit;
wherein when the standby signal indicates that the first signal is more than or equal to the second comparator signal, the switch driving circuit operates in the PWM mode and generates the control signal according to the duty-cycle signal to drive the output-stage circuit.

2. The control circuit operating in PSM according to claim 1, wherein the second error amplifier of the pulse skip circuit receives the feedback voltage and a second reference voltage to generate the second signal, and the pulse skip circuit further includes:
a voltage adjustment element coupled to the PWM generation circuit and the second error amplifier, configured for receiving the first signal and the second signal, increasing the second comparator signal according to a value of the second signal, and comparing the first signal with the second comparator signal to generate the standby signal in PSM.

3. The control circuit operating in PSM according to claim 2, wherein the voltage adjustment element includes:
a constant current source connecting a resistor in series;
a variable current source electrically connected to an end-point between the constant current source and the variable current source and generating the second comparator signal indicating the increased second signal at the end-point according to the second signal and the constant current source; and
a comparator electrically connected to the end-point and the PWM generation circuit and comparing the first signal with the second comparator signal to generate the standby signal in PSM.

4. The control circuit operating in PSM according to claim 1, wherein the gain value of the first error amplifier has a first upper limit value, and the gain value of the second error amplifier has a second upper limit value.

5. The control circuit operating in PSM according to claim 1, wherein the first error amplifier of the PWM generation circuit receives the feedback voltage and a first reference voltage to generate the first signal, and the PWM generation circuit further includes:
a comparator coupled to the first error amplifier, receiving a sawtooth signal and the first signal, and comparing the sawtooth signal with the first signal to generate the duty-cycle signal in the PWM mode.

6. A voltage converter operating in a PSM comprising:
an output-stage circuit configured for converting an input voltage into an output voltage and generating a feedback voltage related to the output voltage;
a PWM generation circuit coupled to the output-stage circuit and configured for generating a first signal indicating the feedback voltage condition and a duty-cycle signal in a PWM mode by a first error amplifier;
a pulse skip circuit coupled to the output-stage circuit and the PWM generation circuit, configured for receiving the first signal, generating a second signal indicating the feedback voltage condition by a second error amplifier, generating a second comparator signal according to the second signal, and comparing the first signal with the second comparator signal to generate a standby signal in PSM, wherein a gain value of the second error amplifier is less than a gain value of the first error amplifier; and
a switch driving circuit coupled to the PWM generation circuit, the pulse skip circuit and the output-stage circuit, and configured for receiving the duty-cycle signal and the standby signal;
wherein when the standby signal indicates that the first signal is less than the second comparator signal, the switch driving circuit operates in PSM and decreases the duty-cycle signal to generate a control signal to drive the output-stage circuit;
wherein when the standby signal indicates that the first signal is more than or equal to the second comparator signal, the switch driving circuit operates in the PWM mode and generates the control signal according to the duty-cycle signal to drive the output-stage circuit.

7. A control circuit operating in a PSM, adapted for a voltage converter and used for converting an input voltage into an output voltage by controlling an output-stage circuit of the voltage converter, wherein the output-stage circuit generates a feedback voltage related to the output voltage, the control circuit comprising:
a PWM generation circuit coupled to the output-stage circuit and configured for generating a first signal indicating the feedback voltage condition and a duty-cycle signal in a PWM mode by a first error amplifier;
a pulse skip circuit coupled to the output-stage circuit and the PWM generation circuit, configured for receiving the first signal, generating a second signal indicating the feedback voltage condition by a second error amplifier, generating a first comparator signal according to the first signal and the second signal, and comparing the first comparator signal with a constant voltage signal related to the first signal to generate a standby signal in PSM, wherein a gain value of the second error amplifier is less than a gain value of the first error amplifier; and
a switch driving circuit coupled to the PWM generation circuit, the pulse skip circuit and the output-stage circuit, and configured for receiving the duty-cycle signal and the standby signal;
wherein when the standby signal indicates that the first comparator signal is less than the constant voltage signal, the switch driving circuit operates in PSM and decreases the duty-cycle signal to generate a control signal to drive the output-stage circuit;
wherein when the standby signal indicates that the first comparator signal is more than or equal to the constant voltage signal, the switch driving circuit operates in the PWM mode and generates the control signal according to the duty-cycle signal to drive the output-stage circuit.

8. The control circuit operating in PSM according to claim 7, wherein the second error amplifier of the pulse skip circuit receives the feedback voltage and a second reference voltage to generate the second signal, and the pulse skip circuit further includes:
   a voltage adjustment element coupled to the PWM generation circuit and the second error amplifier, configured for receiving the first signal and the second signal, decreasing the first comparator signal according to a value of the first signal and a value of the second signal, and comparing the first comparator signal with the constant voltage signal to generate the standby signal in PSM.

9. The control circuit operating in PSM according to claim 8, wherein the voltage adjustment element includes:
   a voltage follower having a positive end receiving the first signal, and a negative end receiving the second signal, and generating the first comparator signal indicating the decreased first signal according to the first signal and the second signal;
   a constant voltage generator configured for generating the constant voltage generator; and
   a comparator electrically connected to the voltage follower and the constant voltage generator and comparing the first comparator signal and the constant voltage signal to generate the standby signal in PSM.

10. The control circuit operating in PSM according to claim 7, wherein the gain value of the first error amplifier has a first upper limit value and the gain value of the second error amplifier has a second upper limit value.

11. The control circuit operating in PSM according to claim 7, wherein the first error amplifier of the PWM generation circuit receives the feedback voltage and a first reference voltage to generate the first signal, and the PWM generation circuit further includes:
   a comparator coupled to the first error amplifier, receiving a sawtooth signal and the first signal, and comparing the sawtooth signal with the first signal to generate the duty-cycle signal in the PWM mode.

* * * * *